(12) United States Patent
Desai et al.

(10) Patent No.: US 8,495,257 B2
(45) Date of Patent: Jul. 23, 2013

(54) NETWORK DIRECT MEMORY ACCESS

(75) Inventors: Shailendra S. Desai, San Jose, CA (US);
Mark D. Hayter, Menlo Park, CA (US);
Dominic Go, San Jose, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 12/908,741

(22) Filed: Oct. 20, 2010

(65) Prior Publication Data

US 2011/0035459 A1 Feb. 10, 2011

Related U.S. Application Data

(63) Continuation of application No. 11/505,736, filed on Aug. 17, 2006, now Pat. No. 7,836,220.

(51) Int. Cl.
*G06F 13/28* (2006.01)
*G06F 15/167* (2006.01)

(52) U.S. Cl.
USPC .............................. 710/22; 710/26; 709/216

(58) Field of Classification Search
USPC .................................. 710/22, 26; 709/216
See application file for complete search history.

(56) References Cited

U.S. PATENT DOCUMENTS

| | | | |
|---|---|---|---|
| 4,868,738 A * | 9/1989 | Kish et al. ..................... | 710/26 |
| 6,775,693 B1 | 8/2004 | Adams | |
| 7,627,693 B2 * | 12/2009 | Pandya ........................ | 709/250 |
| 2002/0156927 A1 | 10/2002 | Boucher et al. | |
| 2004/0073703 A1 * | 4/2004 | Boucher et al. ............... | 709/245 |
| 2006/0075057 A1 | 4/2006 | Gildea et al. | |
| 2008/0002578 A1 | 1/2008 | Coffman et al. | |

OTHER PUBLICATIONS

"Internet Protocol Suite," downloaded from http://en.wikipedia/org/wiki/TCP/IP, last modified Oct. 16, 2005, pp. 1-17.
Recio, Ro, et al., "An RDMA Protocol Specification (Verstion 1.0)," Oct. 2002, pp. 1-60.
Hayter, Mark David, "A Workstation Architecture to Support Multimedia," St. John College, University of Cambridge, A dissertation submitted for the degree of Doctor of Philosophy, Sep. 1993, pp. 1-111.
Kotabe, et al., "High-Speed Bulk Data Transfer Architecture for Gbit/s Throughput," Electronics & Communications in Japan, Part 1—Communications, Wiley Publishers, Hoboken, NJ, vol. 86, No. 11, Part 1, 2003, pp. 57-65.
International Search Report, International Application No. PCT/US2007/018329, Feb. 8, 2008.
Office Action from foreign counterpart Application No. 07 837 039. 2-2416, mailed Feb. 26, 2010.

* cited by examiner

*Primary Examiner* — Idriss N Alrobaye
*Assistant Examiner* — Zachary K Huson
(74) *Attorney, Agent, or Firm* — Lawrence J. Merkel; Meyertons, Hood, Kivlin, Kowert & Goetzel, P.C.

(57) ABSTRACT

In one embodiment, a system comprises at least a first node and a second node coupled to a network. The second node comprises a local memory and a direct memory access (DMA) controller coupled to the local memory. The first node is configured to transmit at least a first packet to the second node to access data in the local memory and at least one other packet that is not coded to access the local memory. The second node is configured to capture the packet from a data link layer of a protocol stack, and wherein the DMA controller is configured to perform one more transfers with the local memory to access the data specified by the first packet responsive to the first packet received from the data link layer. The second node is configured to process the other packet to a top of the protocol stack.

20 Claims, 11 Drawing Sheets

| Header (Packet Length=DLL and NDMA Header Length), Status |
| Buffer Pointer (to DLL/NDMA Header) |
| Write Address |
250
Fig. 8
| Header (Packet Length=DLL and NDMA Header Length+Payload), Status |
| Buffer Pointer (to DLL/NDMA Header) |
| Read Address, Size=Payload |
252
Fig. 9
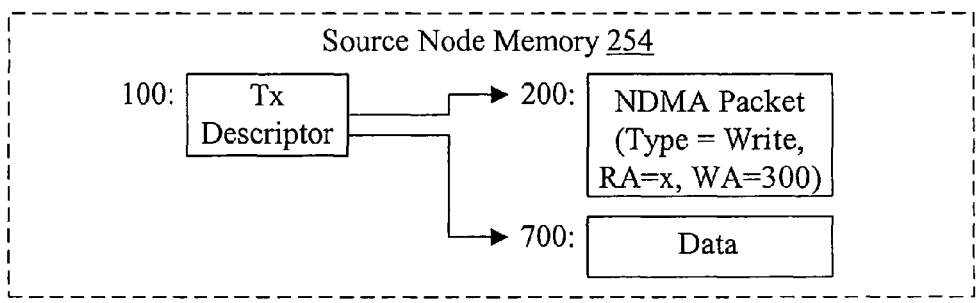
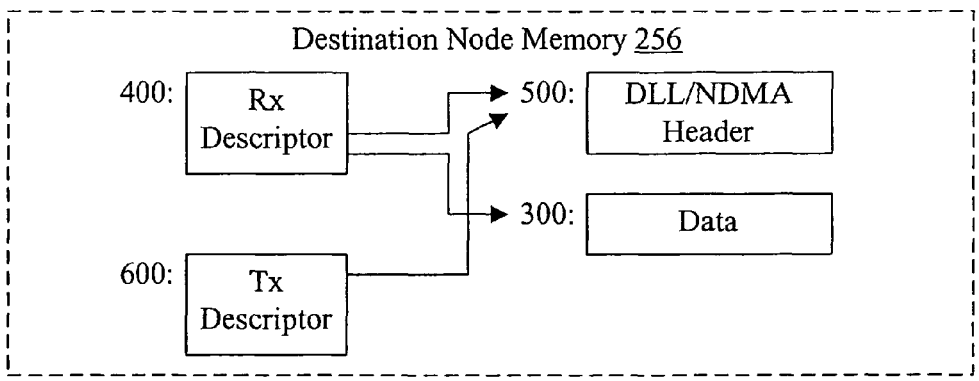
Fig. 10

NETWORK DIRECT MEMORY ACCESS

This application is a continuation of U.S. application Ser. No. 11/505,736, which was filed on Aug. 17, 2006 now U.S. Pat. No. 7,836,220.

BACKGROUND

1. Field of the Invention

This invention is related to electronic circuitry on a network, and more particularly, to performing direct memory access (DMA) over the network from one node to another.

2. Description of the Related Art

Networking of computers and other electronic devices has become ubiquitous. While a variety of networking standards exist, Ethernet is one of the most popular. In particular, Gigabit Ethernet and 10 Gigabit Ethernet are becoming widely used. Various protocols are built on top of the network standard, using the network to communicate. The most popular suite of protocols is typically referred to as the transmission control protocol/Internet protocol (TCP/IP).

Communications between devices on the network generally involves providing data to be transmitted, usually prepended with a header that is application-specific. As the data travels down the protocol stack (from TCP to IP to Ethernet to physical transmission) additional header and/or trailer information is added by each layer until the packet transmitted on the network media is formed. The process of adding header/trailer information to a packet is referred to as encapsulation. When a packet is received at the destination, the packet travels up the protocol stack (from Ethernet to IP to TCP to application). Each layer strips off its header and/or trailer data, processes the data, and forwards the packet up to the next layer (assuming no errors are found).

While the protocol stack provides for communication between networked devices, it is not very efficient for moving large amounts of data. For example, processing the packet often involves copying the packet into memory in a receiving device, and then copying the received data to the application's memory space. This extra movement of data is not much of an issue if the amount of data is small, but can be a significant performance issue if the amount of data is large.

One attempt to make data movement more efficient over a network is the remote DMA (RDMA) protocol proposed by the RDMA Consortium. Generally, DMA refers to the direct access by circuitry to memory independent of a central processing unit (CPU) during the access. The CPU may generally be involved in programming the DMA circuitry, but the access itself is performed by the DMA circuitry. RDMA provides a protocol for one network device to directly access memory in another network device without CPU involvement in the actual access.

The RDMA protocol is specified above the TCP layer in the TCP/IP protocol. Thus, RDMA operations travel from the top of the protocol stack to the bottom on the transmitter side, and then up the protocol stack to the top on the receiver side. Typically, RDMA circuitry includes building rudimentary TCP/IP processing hardware that can receive a packet, terminate TCP/IP, process the packet through TCP/IP to the application layer, and extract the data and address at the application layer for writing to memory. The RDMA protocol can prevent the copying of the packet to memory (and then subsequently copying the data payload to memory), making the data transfer more efficient (especially for larger data payloads). However, implementing the RDMA protocol is expensive in terms of hardware overhead (e.g. building TCP/IP processing into hardware) as well as software overhead.

SUMMARY

In one embodiment, a system comprises at least a first node and a second node coupled to a network. The second node comprises a local memory and a direct memory access (DMA) controller coupled to the local memory. The first node is configured to transmit at least a first packet to the second node to access data in the local memory and at least one other packet that is not coded to access data in the local memory. The second node is configured to capture the packet from a data link layer of a protocol stack, and wherein the DMA controller is configured to perform one more transfers with the local memory to access the data specified by the first packet responsive to the first packet received from the data link layer. The second node is configured to process the other packet to a top of the protocol stack In another embodiment, a node comprises a network interface controller (NIC) configured to couple the node to a network, a local memory, and a DMA controller coupled to the local memory. The NIC is configured to capture a first packet from a data link layer of processing. Coupled to receive the first packet from the NIC, the DMA controller is configured to perform one more transfers with the local memory to access the data specified by the first packet.

In one embodiment, a method comprises receiving a packet from a network in a node; determining that the packet specifies a transfer of data with a local memory in the node at a data link layer a protocol stack; routing the packet to a DMA controller responsive to the detecting; and the DMA controller performing transfers with the local memory in response to the packet.

In another embodiment, a system comprises at least a first node and a second node coupled to a network. The second node comprises a local memory and a direct memory access (DMA) controller coupled to the local memory. The first node is configured to transmit at least a first packet to the second node to access data in the local memory, and an address to be accessed in the local memory is included in a header of the packet. Responsive to the first packet, the DMA controller is configured to perform one or more transfers with the local memory to access the data at the address specified by the first packet.

BRIEF DESCRIPTION OF THE DRAWINGS

The following detailed description makes reference to the accompanying drawings, which are now briefly described.

FIG. 8 is a high level block diagram of a descriptor for a DMA write operation for one embodiment.

FIG. 9 is a high level block diagram of a descriptor for a DMA read operation for one embodiment.

FIG. 10 is a block diagram illustrating memory contents after one embodiment of a DMA write operation.

Figure 1:
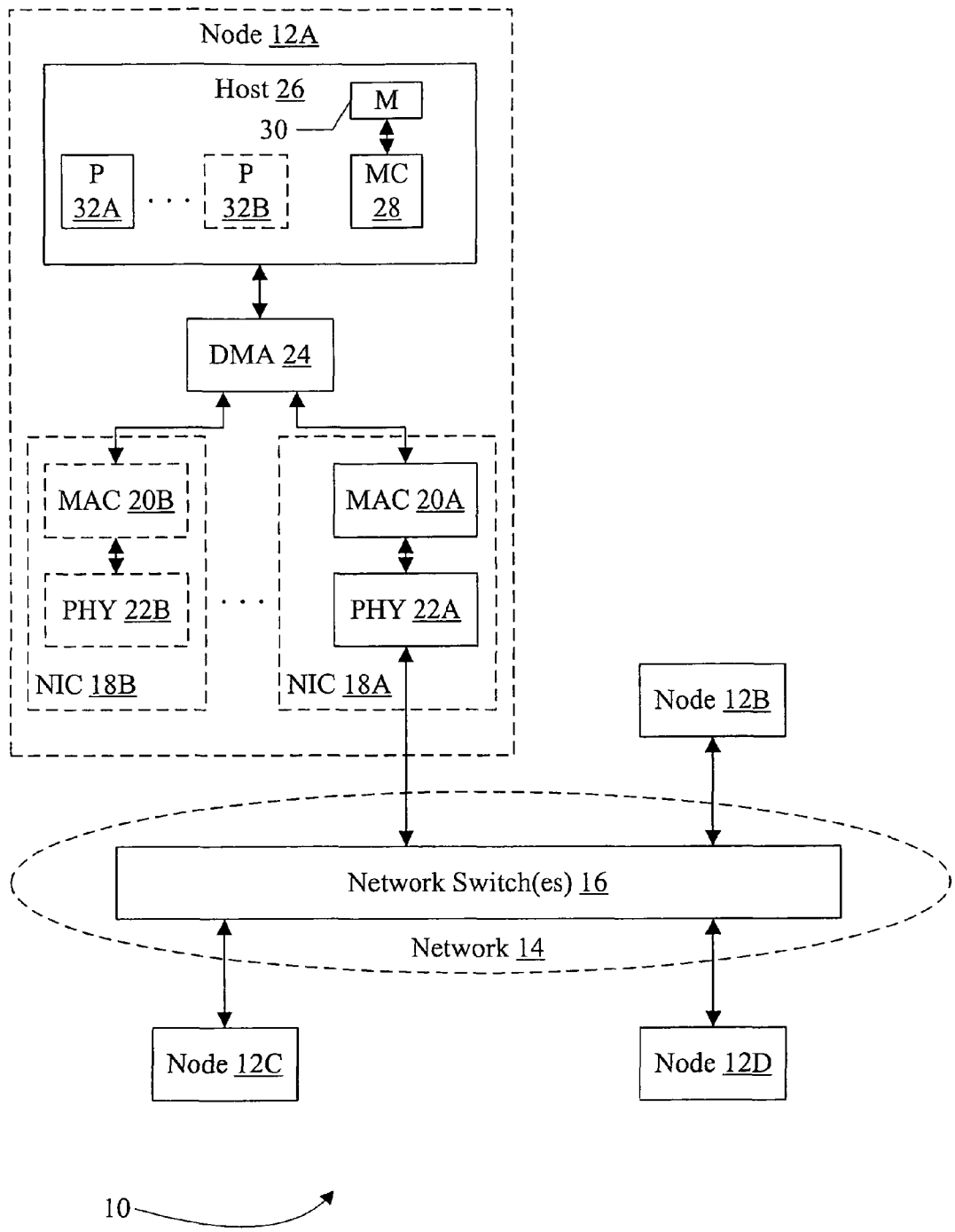
FIG. 1 is a block diagram of one embodiment of a system including several nodes coupled to a network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, a block diagram of one embodiment of a system 10 including a plurality of nodes 12A-12D coupled to a network 14 is shown. Various embodiments may have any number of two or more nodes. The network 14 may optionally include one or more network switches 16 that route packets from one node to another. Other embodiments need not include switches, and instead the network 14 may comprise individual connections between nodes, daisy chain connections, etc.

The network 14 may comprise any communication media that can be used with the network standard implemented by the nodes 12A-12D. For example, various embodiments may use twisted pair cables, fiber optics, wireless communication, telephone lines, etc. Network switches 16, if included, may be configured to route packets from one media to another. The network switches may use any information in the packet for routing, except for certain fields that are designated as not useable for routing (e.g. the type field in the data link layer header, described in more detail below). Network switches may also be referred to as routers or gateways.

Any network standard may be implemented on the network 14. Ethernet, Gigabit Ethernet, and/or 10 Gigabit Ethernet may be examples of network standards used herein. Other network standards may be used in other embodiments (e.g. token ring, asynchronous transfer mode (ATM), etc.).

The node 12A is shown in more detail in FIG. 1. Node 12A is one example of the components that may be included in a node. Other embodiments may include any desired set of components. In the illustrated embodiment, the node 12A includes a network interface controller (NIC) 18A, and may optionally include a second NIC 18B. The NICs 18A-18B each include a media access controller (MAC) 20A-20B coupled to a physical layer (PHY) 22A-22B. The PHYs 22A-22B are coupled to the network communication media, and the MACs 20A-20B are coupled to a DMA controller 24, which is further coupled to a host 26. The host 26 may include a local memory (comprising one or more memory controllers such as memory controller 28 and one or more memories, such as memory 30). The host 26 may also include one or more processors 32A-32B. The host 26 may further include any other desired circuitry (e.g. caches, one or more bridges to peripheral interfaces, peripheral circuitry, etc.). In one embodiment, the node 12A may be a system on a chip (SOC) configuration in which the components shown are integrated onto a single semiconductor substrate. In another embodiment, the memory 30 is not integrated but other components are integrated. In still other embodiments, any amount of discrete components and integrated components may be used.

Other nodes 12B-12D may be similar to node 12A, in some embodiments. Alternatively, one or more other nodes may have any other desired configuration. Nodes may include a local memory and/or DMA controller and any other desired circuitry. Generally, a node may include any hardware that is configured to communicate on a network.

The network interface controllers 18A-18B are configured to transmit and receive packets on the network 14, according to the network standard implemented on the network 14. The MACs 20A-20B may comprise circuitry implementing the media access controller functionality defined for network interfaces. For example, one or more of the MACs 20A-20B may implement the Gigabit Ethernet standard. One or more of the MACs 20A-20B may implement the 10 Gigabit Ethernet Attachment Unit Interface (XAUI) standard. Other embodiments may implement other Ethernet standards, such as the 10 Megabit or 100 Megabit standards, or any other network standard. Among other things, the MACs 20A-20B that implement Ethernet standards may strip off the interframe gap (IFG), the preamble, and the start of frame delimiter (SFD) from received packets and may provide the remaining packet data to the DMA controller 24 for DMA to memory. The MACs 20A-20B may also be configured to insert the IFG, preamble, and SFD for packets received from the DMA controller 24 as a transmit DMA transfer, and may transmit the packets to the PHYs 22A-22B for transmission.

The PHYs 22A-22B may generally comprise the circuitry configured to physically communicate on the network 14. In one particular embodiment, the PHYs 22A-22B may comprise a set of serializer/deserializer (SERDES) circuits that may be configured for use as PCI Express lanes or as Ethernet connections. The PHYs 22A-22B may include the circuitry that performs $8b/10b$ encoding/decoding for transmission through the SERDES and synchronization first-in, first-out (FIFO) buffers, and also the circuitry that logically configures the SERDES links for use as PCI Express or Ethernet communication links.

The DMA controller 24 is configured to perform DMA transfers between the NICs 18A-18B and the memory system. That is, the DMA controller 24 may be coupled to the memory controller 28 (and other memory controllers in the host 26, if more than one memory controller is included) and may perform transfers with the memory controller 28 to transfer the data. For example, a write operation may comprise one or more transfers of data from the DMA controller 24 to the memory controller 28 (which may update the memory locations addressed by the write operation in the memory 30). A read operation may comprise one or more transfers of data from the memory controller 28 to the DMA controller 24. The memory controller 28 may read the memory locations addressed by the read operation in the memory 30 to supply the data from the data transfers. In some embodiments, the DMA controller 24 may also be configured to perform operations on the DMA data as the data is being transferred, if so specified by the transfer. The host 26 may couple the processors 32A-32B, the memory controller 28, the DMA controller 24 in any desired fashion (e.g. one or more buses, point to point links, packet interfaces, etc.).

The processors 32A-32B comprise circuitry to execute instructions defined in an instruction set architecture implemented by the processors 32A-32B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controller 28 comprises circuitry configured to interface to the memory 30. For example, the memory controller 28 may be configured to interface to dynamic random access memory (DRAM) such as synchronous DRAM (SDRAM), double data rate (DDR) SDRAM, DDR2 SDRAM, Rambus DRAM (RDRAM), etc. The memory controller 28 may receive read and write operations for the memory 30, and may perform the read/write operations to the memory 30.

The memory controller 28 and the memory 30 may form a local memory (which may also include other memory controllers and memory in the node 12A, if any). Generally, a local memory may comprise any memory system that is included in a given node. A local memory may be addressed using addresses which are unique within the node. The same numerical address, in a different node, may refer to memory in the local memory within that other node.

Network DMA

The nodes 12A-12D may be configured to perform DMA transfers from one node to another over the network 14. These DMA transfers will be referred to herein as network DMA transfers (or NDMAs). A source node initiates an NDMA to a destination node. NDMAs may be read or write transfers. A transfer is referred to as a read or write from the point of view of the source node. That is, a transfer of data to the source node from the destination node is an NDMA read. A transfer of data from the source node to the destination node is an NDMA write.

The NDMA packets may be intercepted by the node hardware relatively low in the protocol stack, and may be removed from the protocol stack and handled in hardware directly. For example, the NDMA packets may be intercepted at level 2 (the data link level). Accordingly, the hardware to handle the NDMA packets may not need to implement the remainder of the protocol stack (not even a rudimentary one) in some embodiments. Furthermore, the NDMAs may write/read the data directly to/from the intended target in the local memory, and thus may avoid writing the packet data payload to a temporary memory location (and subsequently moving the packet data payload to another memory location). Accordingly, efficient data transfer may be possible.

In one embodiment, the NDMA packets are defined to appear as nearly as possible to be typical packets on the network. That is, the NDMA packets may appear to be standard packets as defined in the implemented network standard (e.g. Ethernet), and thus may be routed by network switches without the switches being aware of the NDMA functionality. Thus, most of the NDMA information may be included in headers that corresponding to higher levels in the protocol stack.

In one embodiment, NDMA may include several checks to ensure that the NDMA packet did not experience line error during transmission. A relatively high level of error checking may help to prevent the corruption of local memory with erroneous data. Furthermore, a number of checks may be implemented to ensure that a random packet that is similar to an NDMA packet is not erroneously interpreted as an NDMA packet.

In one embodiment, NDMA may further support interprocess communication via semaphore operations between the nodes. Semaphores are often used as high level interprocess control mechanisms (e.g. to handoff control of a critical code section or control over critical data from one process to another). A semaphore packet may be treated similar to a non-semaphore NDMA packet, except that all error checking may be completed by a receiving node prior to writing the data to memory.

Figure 2:
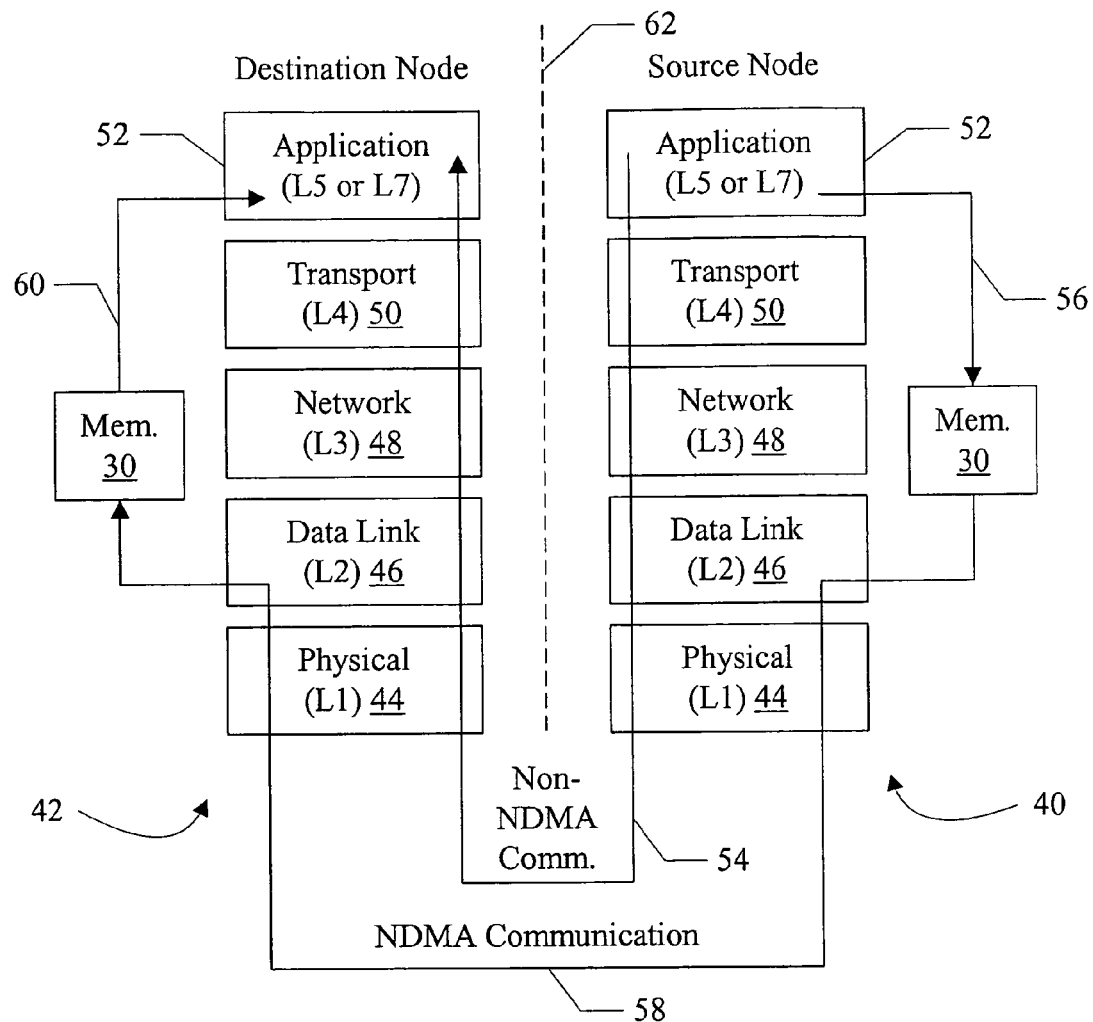
FIG. 2 is a block diagram illustrating the protocol stack on the destination node and source node for one embodiment, and the flow of non-DMA and DMA packets through the protocol stack for the embodiment.

FIG. 2 illustrates one embodiment of a protocol stack 40 in a source node and a protocol stack 42 in a destination node, and illustrates NDMA and non-NDMA packet flow through the stacks. The boundary between nodes is illustrated by vertical dashed line 62. Each stack includes a physical layer 44, a data link layer 46, a network layer 48, a transport layer 50, and an application layer 52.

The physical layer 44 comprises the physical characteristics of the communication, and may correspond to the PHYs 22A-22B in FIG. 1, for one embodiment. The physical layer 44 may include the communication media themselves and related details such as connectors, channel codes, modulation, low-level synchronization and timing, maximum distance, etc.

The data link layer 46 is generally responsible for the transmission of packets on the physical layer 44. The data link layer may include functionality corresponding to the MACs 20A-20B in FIG. 1, for one embodiment. The data link layer may specify the framing of packets (denoting the start and end of packets on the physical layer 44). Ethernet is an example of a data link layer standard.

The network layer 48 is responsible for moving packets around the network 14. The routing of packets may thus be a network layer function. In the TCP/IP protocol stack, the IP protocol is the network layer 48.

The transport layer 50 is used to provide a flow of data between two hosts for the application layer 52. The transport layer 50 may, in some cases, provide for reliable data transfer between hosts (where the underlying network layer 48 may not be reliable, such as IP). The transport layer 50 may be responsible for forming packets of an appropriate size for the network layer 48, handle end to end acknowledgement if reliability is implemented, etc. In the TCP/IP protocol stack, the TCP protocol is the transport layer 50.

The application layer 52 provides the actual applications that communicate over the network (e.g. hypertext transport protocol (HTTP), file transport protocol (FTP), simple mail transport protocol (SMTP), etc.). The application layer 52 may provide services for other applications (e.g. end user applications). Alternatively, a given end user application may directly communicate with the transport layer 50.

A non-NDMA communication (e.g. a normal packet communication) is shown as arrow 54 in FIG. 2. A source node generates the non-NDMA communication at the application layer 52 (or a layer above the application layer). The non-NDMA communication progresses down the protocol stack 40, being encapsulated at each level by a header and/or trailer. Generally, a header may comprise data that is prepended to the packet. That is, the header is inserted at the front of the packet, and is logically transmitted prior to the encapsulated data. On a wide physical interface, it is possible that some header data and encapsulated (or payload) data is transmitted concurrently. A trailer is data that is appended to the encapsulated data. That is, the trailer is inserted at the end of the packet and is logically transmitted after the encapsulated data. Cyclical redundancy check (CRC) data is an example of a trailer.

At the bottom of the protocol stack 40, the packet is physically transmitted to the destination node, where it enters at the bottom of the protocol stack 42. The reverse of encapsulation is performed, with each layer removing (and possibly checking) its header and/or trailer and providing the payload to the next level up.

In contrast, an NDMA communication circumvents a portion of the protocol stack. The application layer 52 in the source node may generate an NDMA packet and write it to the memory 30 in the source node (arrow 56). The packet is transmitted into the data link layer 46, and progresses down to the physical layer 44, to the destination node physical layer 44, and up to the data link layer 46 in the destination node (arrow 58). Thus, at the physical layer 44, the packet may appear to be the same as any other Ethernet packet. At the data link layer 46 in the destination node, the NDMA packet is detected and is written directly to the memory 30, at the local memory address specified in the NDMA packet. The data is thus available to the application layer 52 from the memory 30 (line 60).

Also shown in FIG. 2 are layer numbers. Layer 1, or L1, is the physical layer 44. Similarly, layer 2 (L2) is the data link layer 46; layer 3 (L3) is the network layer 48; and layer 4 (L4) is the transport layer 50. The application layer 52 would logically be layer 5 (L5) in the figure. However, the application layer is sometimes referred to a layer 7 (L7), conforming to the open systems interconnection (OSI) model which has a session layer at layer 5 and a presentation layer at layer 6. Thus, NDMA packets are detected at layer 2 according to this numbering scheme.

Figure 3:
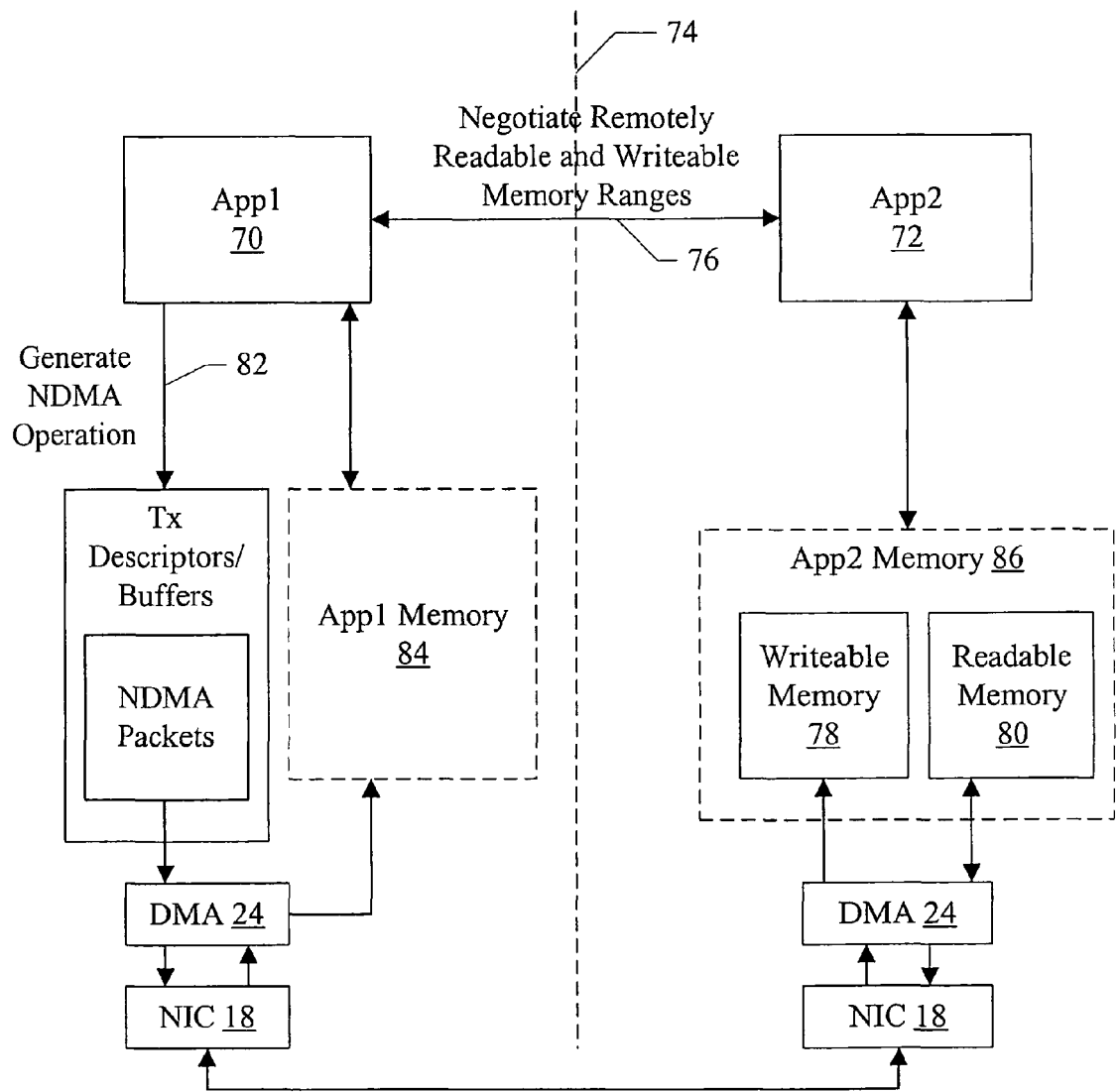
FIG. 3 is a block diagram illustrating a high level view of the source application and destination application using network DMA.

FIG. 3 illustrates the nodes in greater detail, highlighting some additional features of the nodes related to NDMA for one embodiment. In FIG. 3, applications 70 and 72 are illustrated (in different nodes, where the boundary between nodes is illustrated by vertical dashed line 74). The applications 70 and 72 communicate, and may use NDMA as part of their communication.

Prior to initiating NDMA, the applications 70 and 72 negotiate which local memory ranges in each node are remotely readable and/or writeable by the other node (illustrated by arrow 76). The negotiation may take place via non-NDMA packet communications over the network 14. Via the negotiation, each application 70 and 72 may learn the local memory addresses in the other node that they are permitted to read and/or write. Additionally, the applications 70 and 72 may exchange identifiers that may be used to identify the nodes in NDMA packets (described in more detail below).

In the illustrated example, the application 72 provides the application 70 with a writeable memory range 78 and a readable memory range 80 in the memory 86 that is allocated to the application 72. While writeable and readable ranges are shown, a writeable range may also be readable (or a read/write range may be identified). The application 70 records the addresses, along with the read/write characteristics of the range and the identifiers to be used in any NDMA packets to the ranges. Other information may be recorded as well (e.g. which ranges are to be used to communicate which type of data to the application 72 or from the application 72). Such information is application-specific and may vary from embodiment to embodiment.

In the example, after the negotiation is complete, the application 70 generates one or more NDMA operations to the memory 78 or 80 (arrow 82). The application 70 generates NDMA packets and stores them in memory (e.g. in transmit (Tx) descriptors and buffers used by the DMA controller 24, in this embodiment). The DMA controller 24 may transmit the NDMA packets through the NIC 18 to the destination node, in a manner similar to other packets. The NIC 18 in the destination node receives the NDMA packets, detects them as NDMA, and supplies them to the DMA controller 24 in the destination node (along with an indication that the packets are NDMA packets). The DMA controller 24 uses the local memory addresses in the NDMA packets to write the memory 78 or read the memory 80, according to the received NDMA packets. For an NDMA read, the DMA controller 24 may also return the read data as NDMA packets to the source node, and the DMA controller 24 in the source node may write the received data to a second local memory address provided in the packet by the application 70 (memory 84 in FIG. 3). For an NDMA write, the DMA controller 24 may return a write acknowledgement packet to signal that the write arrived safely.

While FIG. 3 illustrates NDMA operations sourced by the application 70, the application 70 may also source NDMA operations (and may readable, writeable, or read/write memory ranges in the memory 84).

As mentioned above, the DMA controller 24 uses descriptors to perform DMAs. Generally, a descriptor may include a data structure in memory that describes a DMA operation to be performed. The descriptor may include status and control information, and may further include one or more pointers to buffers that store the data to be transmitted. Each buffer is a contiguous block of memory. In other embodiments, the descriptor may direct store the data to be transmitted. The descriptors may be arranged in rings or chains, on a per DMA channel basis. The exact format of a descriptor varies from embodiment to embodiment.

It is noted that, while memories 84 and 86 are shown in FIG. 3, each of memories 84 and 86 may be part of the memory 30 in the respective node.

Figure 4:
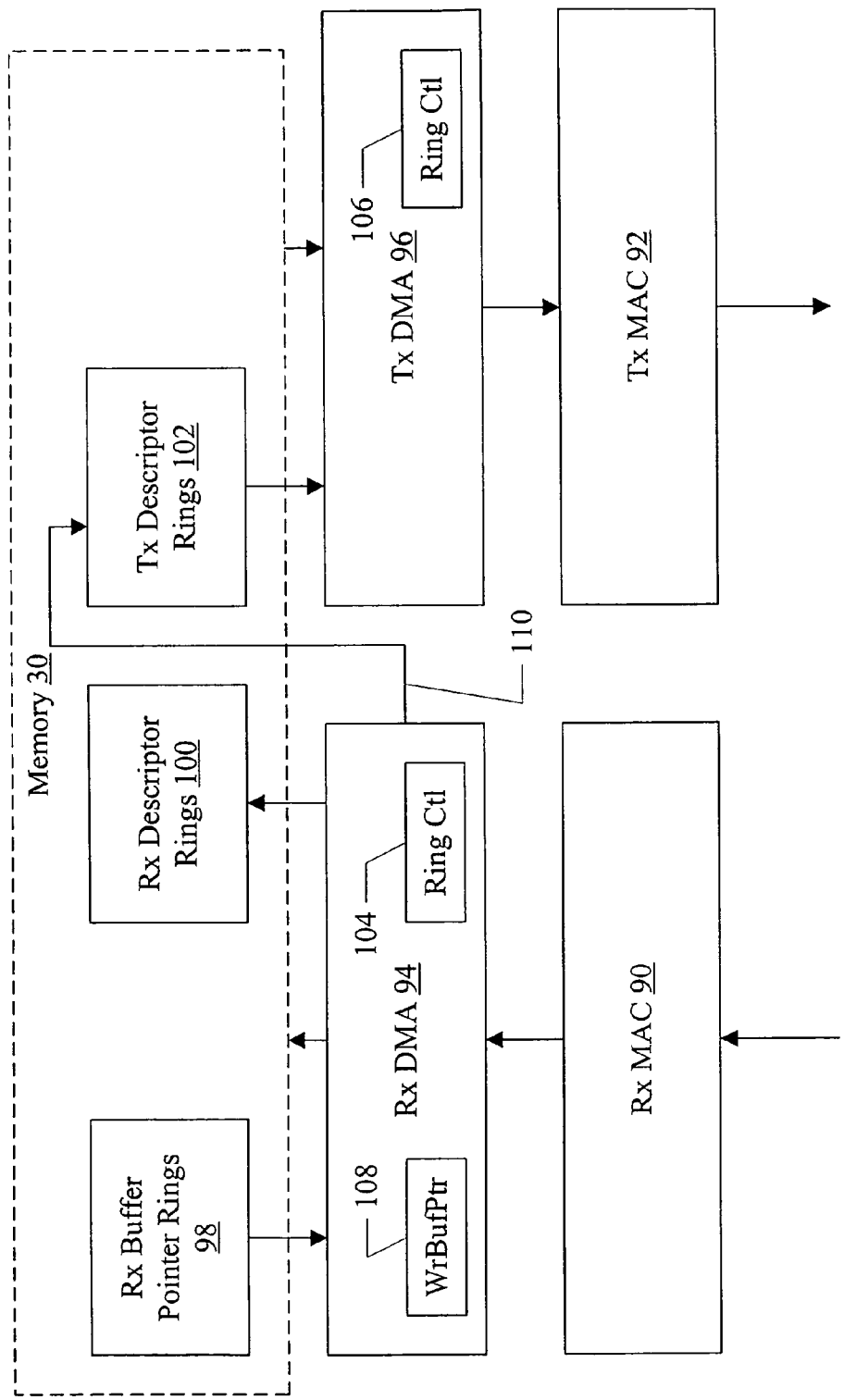
FIG. 4 is a block diagram of media access controller (MAC) and DMA circuitry in more detail for one embodiment.

FIG. 4 is a block diagram illustrating a portion of one implementation of a node. Not all implementations need follow the implementation of FIG. 4. Illustrated in FIG. 4 are a receive (Rx) MAC 90 and a Tx MAC 92, which together may form an implementation of a MAC 20 (along with any other desired circuitry). Also shown in FIG. 4 are an Rx DMA controller 94 and a Tx DMA controller 96, which together may form an implementation of a DMA controller 24 (along with any other desired circuitry). Memory 30 is also shown in FIG. 4, and include Rx buffer pointer rings 98, Rx descriptor rings 100, and Tx descriptor rings 102. Generally, there may be an Rx buffer ring 98 and an Rx descriptor ring 100 for each receive DMA channel. Various embodiments may support any number of receive DMA channels, and software may assign them to NICs and other DMA sources as desired. Ring control registers 104 may be programmed with control values (e.g. ring base address, descriptor/buffer pointer count per ring, etc.) to allow the Rx DMA controller 94 to locate the rings 98 and 100 in memory 30. Similarly, there may be a Tx descriptor ring 102 for each transmit channel, which may be assigned to NICs and other DMA destinations as desired. Ring control registers 106 may be programmed with control values (e.g. ring base address, descriptor count per ring, etc.) to allow the Tx DMA controller 96 to locate the rings in memory 30.

The Rx MAC 90 and the Rx DMA 94 may cooperate to receive packets and write them to memory 30. For a non-NDMA packet, the Rx MAC 90 may identify the receive channel for the packet. The Rx DMA controller 94 may fetch one or more buffer pointers from the Rx buffer pointer ring 98 corresponding to the channel, and may write packet data to the indicated buffers. The Rx DMA controller 94 may also generate a descriptor (or descriptors) for the received packet, including packet status and the buffer pointers consumed by the received packet. The Rx DMA controller 94 may write the descriptors to the Rx descriptor ring 100 corresponding to the receive channel. Software executing on the processors 32A-32B may read the descriptors to process the packets.

For NDMA packets, the Rx MAC 92 may again provide a channel number (assigned to NDMA) and the packet data to the Rx DMA controller 94. If the NDMA packet is a write, rather than using a buffer pointer from the buffer pointer rings 98 to store the data, the Rx DMA controller 94 may use the write address extracted from the NDMA packet. A write buffer pointer register (or registers) 108 may be implemented for each channel, and the Rx DMA controller 94 may write either a buffer pointer or the write address into the register 108 for the channel. When a NDMA packet is received, the Rx DMA controller 94 may write the write address into the register 108. In some embodiments, an Rx buffer pointer may be consumed to store the header information of the packet and an Rx descriptor locating the header information may be created. Additionally, the Rx DMA controller 94 may generate a transmit packet (using the same header information) in the Tx descriptor rings 102 to transmit a write acknowledgement packet to the source node, in some embodiments (line 110).

If the received NDMA packet is a read, the Rx DMA controller 94 may write the header information (including the read address) to an Rx buffer and may store an Rx descriptor for the received packet. The Rx DMA controller 94 may also generate a Tx descriptor pointing to the received packet for transmission, and may write the Tx descriptor to the Tx descriptor rings 102 to transmit the read data back to the source. When the Tx DMA controller 96 processes the descriptor, the Tx DMA controller 96 may use the read address to read the data from memory, thus automatically capturing the desired data payload.

For non-NDMA packets, software executing on the processors 32A-32B may create the packets in memory, and may insert descriptors pointing to the packets in memory into the Tx descriptor rings 102. Thus, the packets in the Tx descriptor rings 102 may include both non-NDMA and NDMA packets. In one embodiment, NDMA packets may be assigned to a different channel or channels that non-NDMA packets, so that software and the Rx DMA controller 94 are not in contention for the same Tx descriptor ring.

Figure 5:
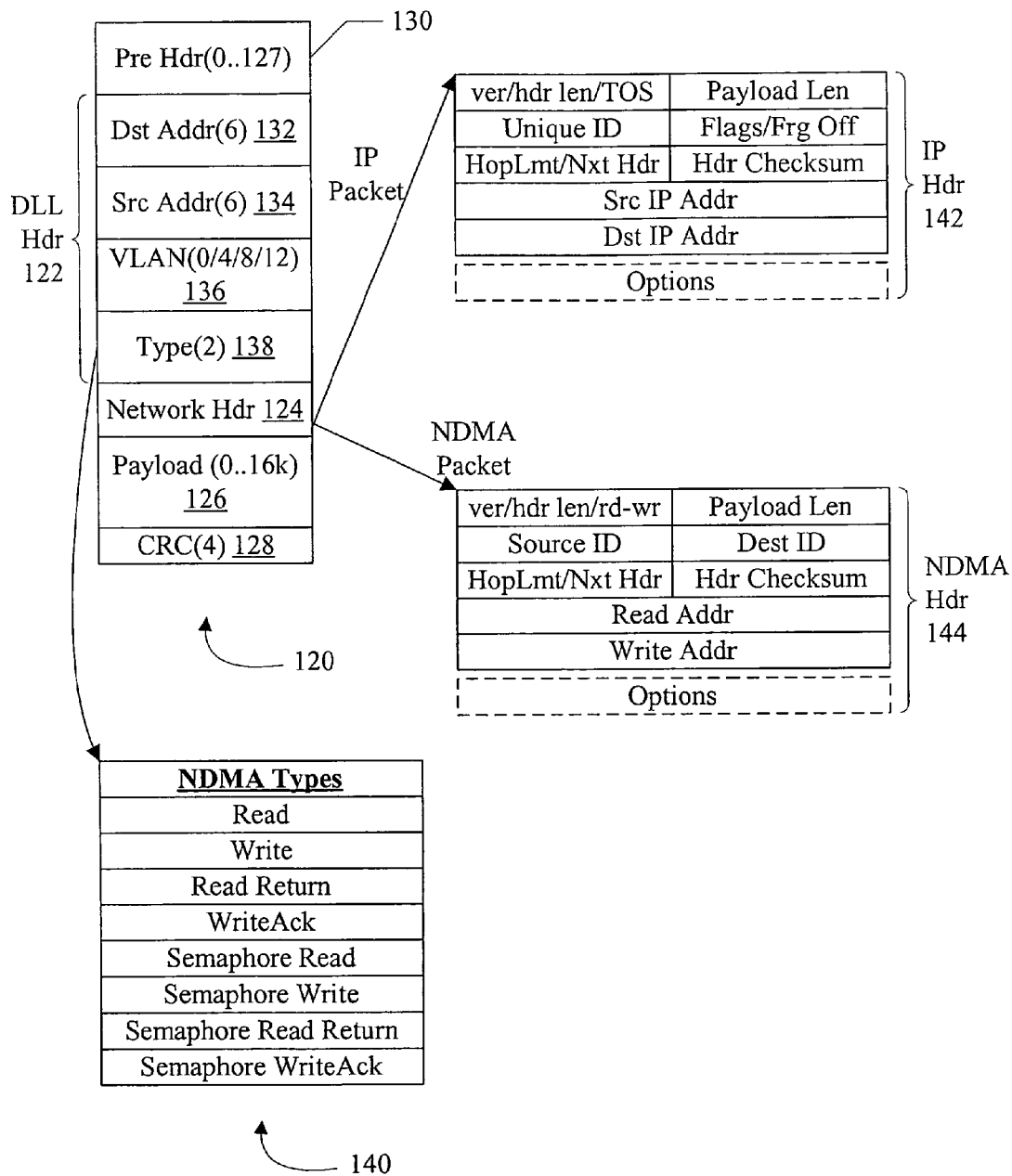
FIG. 5 is a block diagram of one embodiment of a packet.

FIG. 5 is a block diagram of one embodiment of a packet 120 for use with NDMA, as well as non-NDMA packets. The packet 120 includes a data link layer (DLL) header 122, a network header 124, a payload 126, and a CRC field 128. The packet 120 may also optionally include a pre-header 130. Numbers in parentheses in FIG. 5 are the number of bytes in the field, for this embodiment. A range (e.g. 0 . . . 127 in the pre-header 130) indicates that the field may have any number of bytes in the range.

The DLL header 122 includes a destination address field 132, a source address field 134, an optional virtual local area network (VLAN) field 136, and a type field 138. The DLL header 122 may be, for example, a header used when implementing the Ethernet standard for the network 14. Other DLL headers 122 may be used for other network standards. The destination address field 132 and the source address field 134 store the addresses of the destination and source nodes for the packet on the network 14. These addresses are low level addresses used to route packets on a local network. In the Ethernet standard, these addresses are referred to as MAC addresses. The VLAN field 136 may include one or more VLAN tags if virtual LANs are in use, or zero VLAN tags if virtual LANs are not in use or the source node is not a member of a virtual LAN. More particularly, the destination address from the DLL header 122 (and possibly the source address and/or VLAN from the DLL header 122) is often used by network switches 16 for routing around the network 14. Accordingly, by maintaining these fields in a NDMA packet, such packets should be routable by the network switches in a similar fashion to non-NDMA packets.

The type field 138 may be used to indicate the size of the packet (if the value in the type field is less than or equal to 1536 in decimal) or may be used to indicate a type of the packet (if the value of the type field is greater than or equal to 1537 in decimal). Accordingly, the network switches 16 typically do not use the type field for routing. The NDMA packets may thus use the type field to identify the packet as NDMA, and further to identify the type of NDMA packet. A table 140 lists the NDMA types for one embodiment. Any encoding greater than or equal to 1537 in the type field may be used to encode the NDMA types. For example, the following hexadecimal encodings may be used: AA01=Read, AA02=Write, AA07=Read Return, AA08=WriteAck, AA09=Semaphore Read, AA0A=Semaphore Write, AA0B=Semaphore Read Return, AA0C=Semaphore WriteAck. Thus, the third least significant bit may be inverted to generate the Read Return type from the Read type and to generate the WriteAck type from the Write type, with this encoding. Additionally, the fourth least significant bit may distinguish between semaphore and non-semaphore packets. However, as noted, any encoding may be used.

The Read and Write types may be used by the source node of an NDMA operation to initiate an NDMA read or write, respectively. The Read Return type may be used by the destination node to return read data in response to a Read, and the WriteAck type may be used by the destination node to acknowledge a Write. Other embodiments may not include acknowledgement of writes, if desired. Semaphore versions of the types may be used to perform interprocess semaphore communications. As mentioned above, all error checking on semaphore packets may be completed prior to writing the data to memory (e.g. to prevent memory corruption in a semaphore area). To facilitate completion of the error checking for semaphores, the size of the data payload may be limited in some embodiments (e.g. to 32 bytes or 64 bytes, in various embodiment, or to a cache block size). Any size limit or no size limit may be implemented for semaphores, in various embodiments.

The network header field 124 may have one of two forms, for non-NDMA packets and for NDMA packets respectively. In one embodiment, the non-NDMA packets are IP packets, and the network header field 126 may contain an IP header 142. The IP header 142 includes a version field (e.g. coded to 4 for IPv4 and 6 for IPv6, shown as Ver in FIG. 5), a header length (hdr len) field, and a type of service (TOS) field. The IP header 142 further include a payload length (Payload Len) field indicating the size of the payload field 126, a Unique ID field typically used as a sequence identifier among multiple packets, a flags/fragment offset (Flags/Frg Off), a hop limit (HopLmt) field, a next header (Nxt Hdr) field, a header checksum (Hdr Checksum) field protecting the IP header 142, a source IP address (Src IP Addr) field, a destination IP address (Dest IP addr) field and an optional options field (Options).

The network header field 124 for an NDMA packet (NDMA header 144) may be defined in a similar fashion to the IP header 142. That is, some fields are reused and are placed in the same position within the network header field 124 as they are in the IP header 142. Such a definition may simplify processing of the header, since some fields may be processed in similar fashion to the IP header 142. For example, the version field is still used (and is coded to a value other than 4 or 6, to distinguish from IPv4 and IPv6). The header length, payload length, hop limit, and optional options fields are also reused. The next header field is also used, and is coded to indicate that the header is an NDMA header. The TOS field is reused to indicate whether the operation is a read or write, which may be used to verify the type field 138. The header checksum is preserved, and protects the NDMA header 144 against line error in a similar fashion to the header checksum in the IP header 142. Particularly, the header checksum protects the read and write addresses, which may aid in preventing the corruption of the wrong memory locations if an error is introduced into the addresses during transmission.

The unique ID and flags/fragment offset fields are redefined in the NDMA packet 144 to be a source ID and a destination ID. These IDs may be established by the application layers (e.g. the applications 70 and 72 in FIG. 2) during NDMA negotiation, or may be IDs of the nodes in the system 10 (e.g. a node number assigned in the system 10). Thus, a destination or source node may verify that identity of the other node when an NDMA packet is received. The read address field may include the local memory address in the destination node for an NDMA read. The write address field may include the local memory address in the destination node for an NDMA write. For an NDMA read, the write address field may be the local memory address in the source node to which the data should be written (and thus may be returned in the write address field of the corresponding Read Return packet, to be used by the source node).

The definition of the NDMA header 144 may also permit the DLL header 122 and the NDMA header 144 from a received Read or Write packet to be copied to the transmit DMA side for use as the Read Return or WriteAck packet. The destination and source address fields 132 and 134 may be exchanged and the type field 138 may be modified to generate the correct DLL header 122 and NDMA header 144 for the Read Return/WriteAck packet. These modifications may be performed by the NIC 18, in one embodiment, as the Read Return/WriteAck packet is transmitted.

The payload field 126 is the network packet payload. For NDMA packets, the payload field 126 may include only the data being transmitted. Thus, for NDMA read packets and WriteAck packets, the payload field 126 may be empty. For NDMA write packets and read return packets, the payload field may be the data transmitted in the NDMA operation. In other embodiments, the WriteAck and Read Return packet may carry an error code in the payload, or the error code may be encoded into the header field 124 (e.g. as an option).

The CRC field 128 may be the CRC data calculated over the packet, as specified in the Ethernet standard, for example. The CRC field may be used in error checking.

In one embodiment, NDMA packets may be defined to exclude a pre-header field 130. In other embodiments, the pre-header field 130 may be permitted. Also, in some embodiments, a time stamp may be inserted in the Ethernet header to make it 16 bytes long (when no VLAN tags are included), which may more easily align data in some implementations. Furthermore, the VLAN field 136 may be limited to zero or 1 VLAN tags, in some embodiments. Other embodiments may omit the timestamp and/or the VLAN limits, as desired.

Figure 6A:
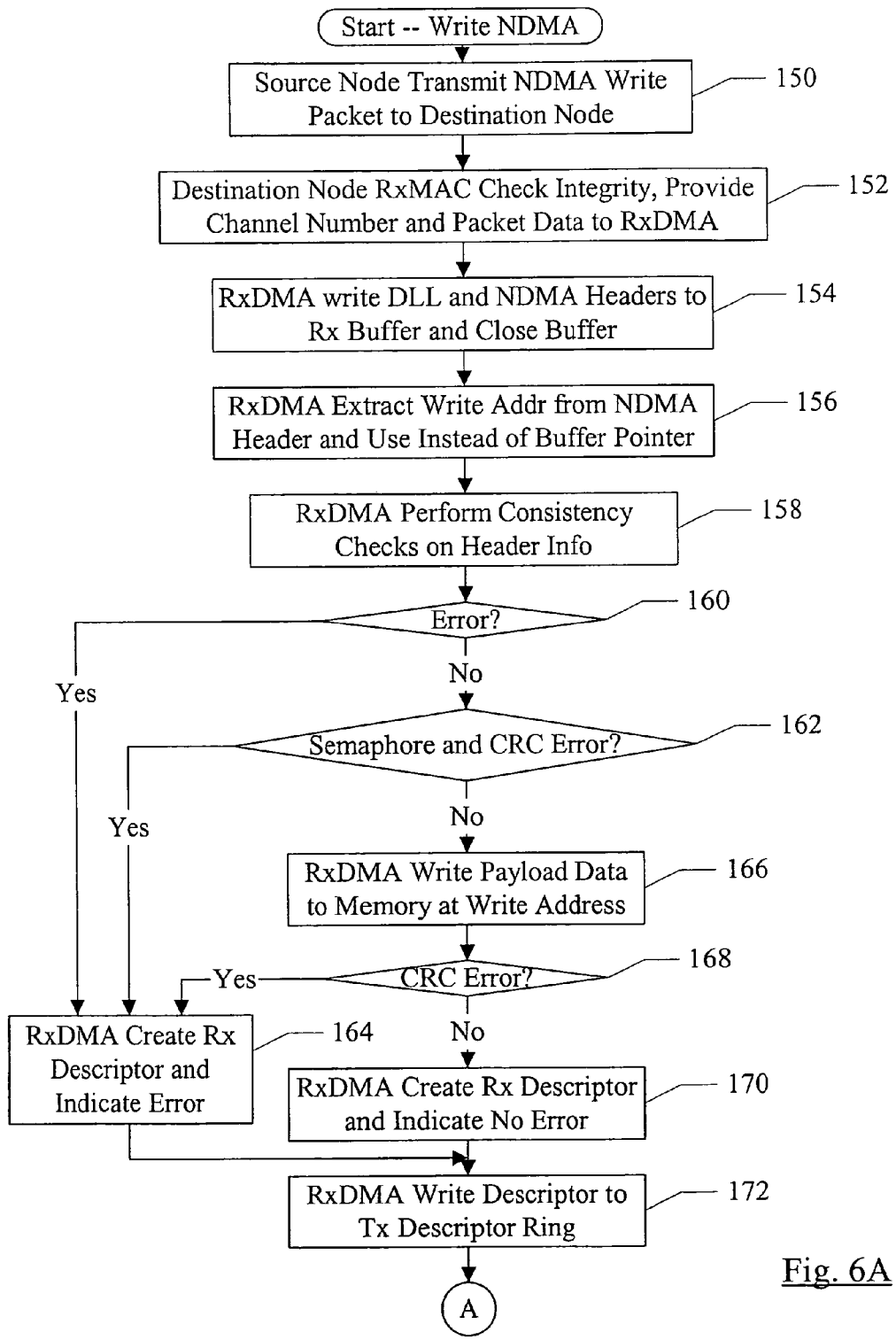
FIGS. 6A-6B are a flowchart illustrating a DMA write operation for one embodiment.
Figure 6B:
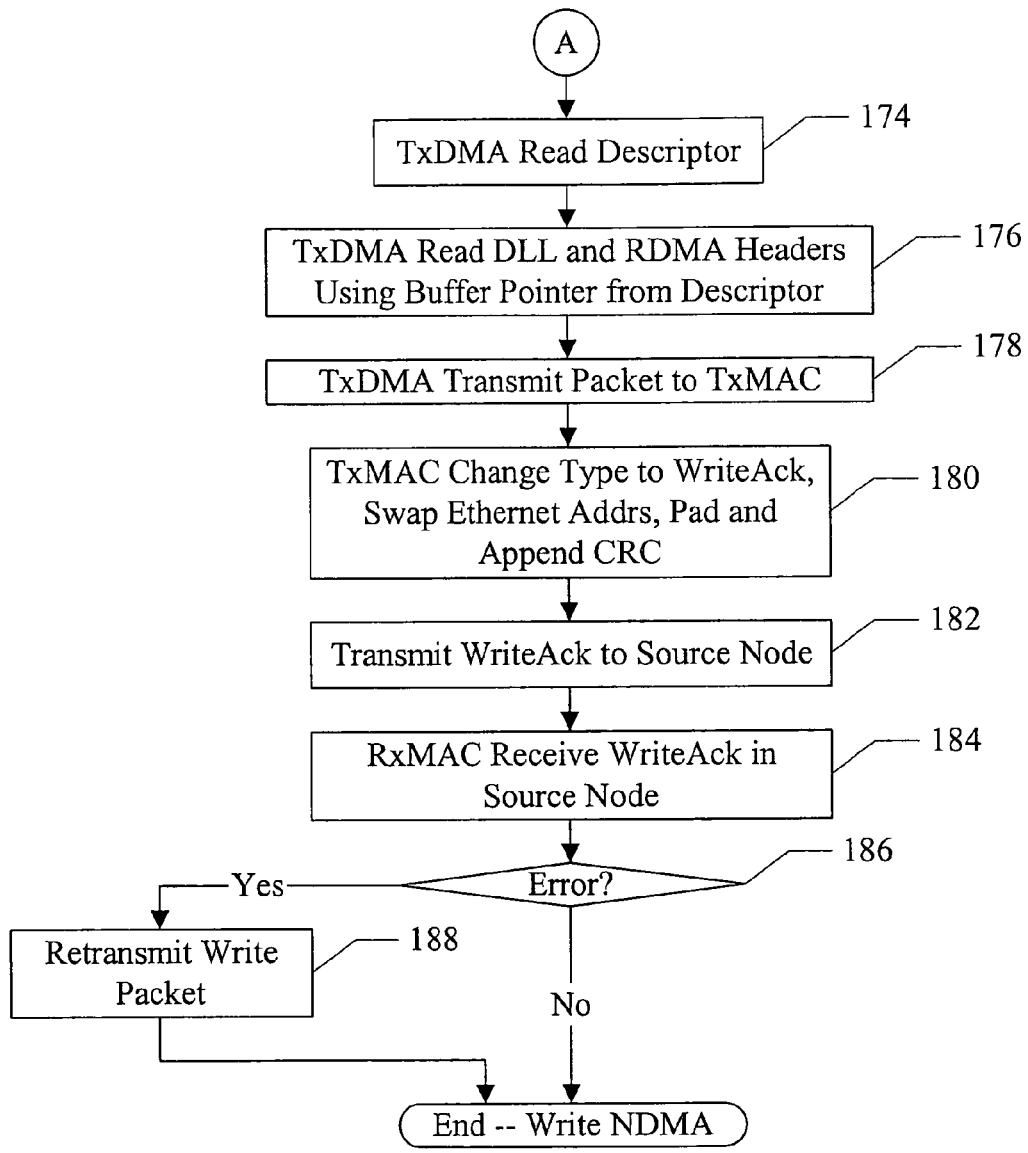

Turning next to FIGS. 6A-6B, a flowchart is shown illustrating operation of one embodiment of node hardware in performing an NDMA write operation, for one embodiment. Some portions of the operation may be performed in software, in other embodiments. While the blocks are shown in a particular order in FIGS. 6A-6B for ease of understanding, other orders may be used and/or blocks may be performed in parallel by combinatorial logic circuitry in the nodes. Blocks, combinations of blocks, and/or the flowchart as a whole may be pipelined over multiple clock cycles.

The source node transmits the NDMA write packet to the destination node (block 150). In this embodiment, one NDMA write packet may be transmitted at a time, with a corresponding WriteAck packet being returned by the destination node. Up to 16 kilobytes of data may transferred in the NDMA write packet, for example. Other embodiments may permit a single NDMA operation to be multiple write packets, with either one WriteAck for the entire operation or a WriteAck for each write packet. In one embodiment, the DMA controller 24 (or more particularly, the Tx DMA controller 96) may read the NDMA write packet from one or more Tx descriptors and buffers, and may transmit the packet to the NIC 18 (and more particularly the Tx MAC 92) for transmission on the network.

The destination node receives the NDMA write packet. The Rx MAC 90 in the destination node may check the integrity of the NDMA write packet (e.g. to detect line induced errors) and may provide a channel number and the packet data to the Rx DMA controller 94. The Rx MAC 90 may also signal the Rx DMA controller 94 that the packet is an NDMA packet (block 152). In one embodiment, the nodes may dedicate one or more channels for NDMA packets, and the mapping of the packet to the channel may be determined accordingly. The Rx MAC 90 may detect the NDMA packet via the encoding in the Type field 138. The integrity checks may include checking the header checksum to detect an error in the network header 124, and checking the CRC from the field 128 at the end of the packet. Forwarding of the packet to the Rx DMA controller 94 may occur while the Rx MAC awaits the end of the packet to check the CRC, for non-semaphore NDMA packets.

The Rx DMA controller 94 in the destination node may consume an Rx Buffer pointer and may write the DLL header 122 and the NDMA header 144 to the buffer. The Rx DMA controller 94 may then close the buffer, storing no additional data to the buffer (block 154). The Rx DMA controller 94 may also extract the write address from the NDMA header 144, and use the write address as the local memory address to write the payload 126 instead of a buffer pointer (e.g. the Rx DMA controller 94 may store the write address in the WrBufferPtr registers 108 and use the address for writing the data) (block 156). Still further, the Rx DMA controller 94 may perform various consistency checks on the header information from the NDMA write packet (block 158). The consistency checks may be performed to help ensure that a non-NDMA packet is not mistaken for an NDMA packet. The consistency checks may include, in one embodiment: verifying that the destination ID in the NDMA header 142 matches the node's (or application's) destination ID; verifying that the Rd/Wr type in the NDMA header 142 matches the read or write type in the type field 138; verifying the size limit for a semaphore; and verifying that the header checksum indicates no error (as reported by the Rx MAC 90). Other embodiments may implement other consistency checks, including subsets and/or supersets of the above.

If an error is detected in the consistency checks (decision block 160, "yes" leg) or if a CRC error is detected and the operation is a semaphore write (decision block 162, "yes" leg), the Rx DMA controller 94 may create an Rx descriptor for the NDMA packet, indicating an error status (block 164). The Rx descriptor may also include a pointer to the buffer storing the DLL and NDMA headers for the packet. Otherwise (decision blocks 160 and 162, "no" legs), the Rx DMA controller 94 may write the payload data from the packet to memory at the write address extracted from the NDMA header (block 166). For non-semaphore packets, the CRC error may be detected after the data has been completely received (e.g. up to 16 kilobytes of data, in one embodiment). If a CRC error is detected (decision block 168, "yes" leg), the Rx DMA controller 94 may write the Rx descriptor for the packet, indicating the error and including the pointer to the buffer storing the DLL and NDMA headers (block 164). Otherwise, the Rx DMA controller 94 may create the Rx descriptor and indicate no error status, and may also include a pointer to the buffer storing the DLL and NDMA headers (block 170). The Rx DMA controller 94 may also write the descriptor (with or without error status, as appropriate) to the Tx descriptor ring corresponding to the Tx channel dedicated for responses (block 172). The Rx DMA controller 94 may also update the descriptor count in the Tx DMA controller 96 so that the Tx DMA controller 96 becomes aware of the descriptor.

The Tx DMA controller 96 may read the descriptor (block 174) and may use the pointer therein to read the DLL and RDMA headers from memory (block 176). The Tx DMA controller 96 may transmit the packet to the Tx MAC 92 (block 178). The DLL and RDMA headers comprise a WriteAck packet, except that the Type field needs to be changed to the WriteAck type, the source and destination address fields 132 and 134 need to be swapped, the packet may optionally need to be padded, and the CRC may need to be appended. In this embodiment, the Tx MAC 92 is designed to perform those operations (block 180). In other embodiments, the DMA controller 24 may create a new WriteAck packet. The destination node transmits the WriteAck packet to the source node (block 182) and the Rx MAC 90 in the source node receives the WriteAck packet (block 184). If the packet indicates that the destination node detected an error (decision block 186, "yes" leg), the source node may retransmit the NDMA write packet (block 188). Retransmitting the packet may take the flowchart back to block 150.

Figure 7A:
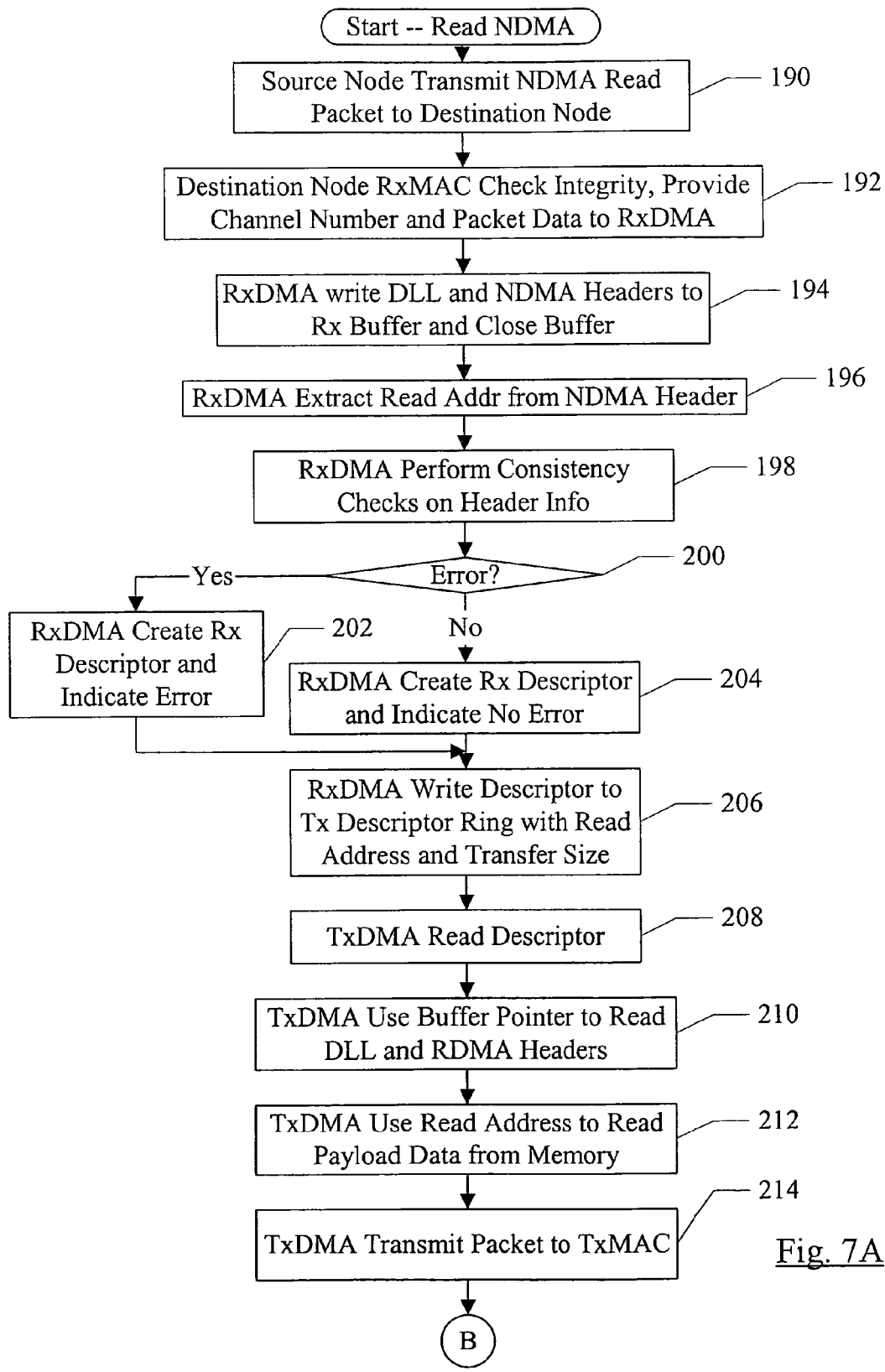
FIGS. 7A-7B are a flowchart illustrating a DMA read operation for one embodiment.
Figure 7B:
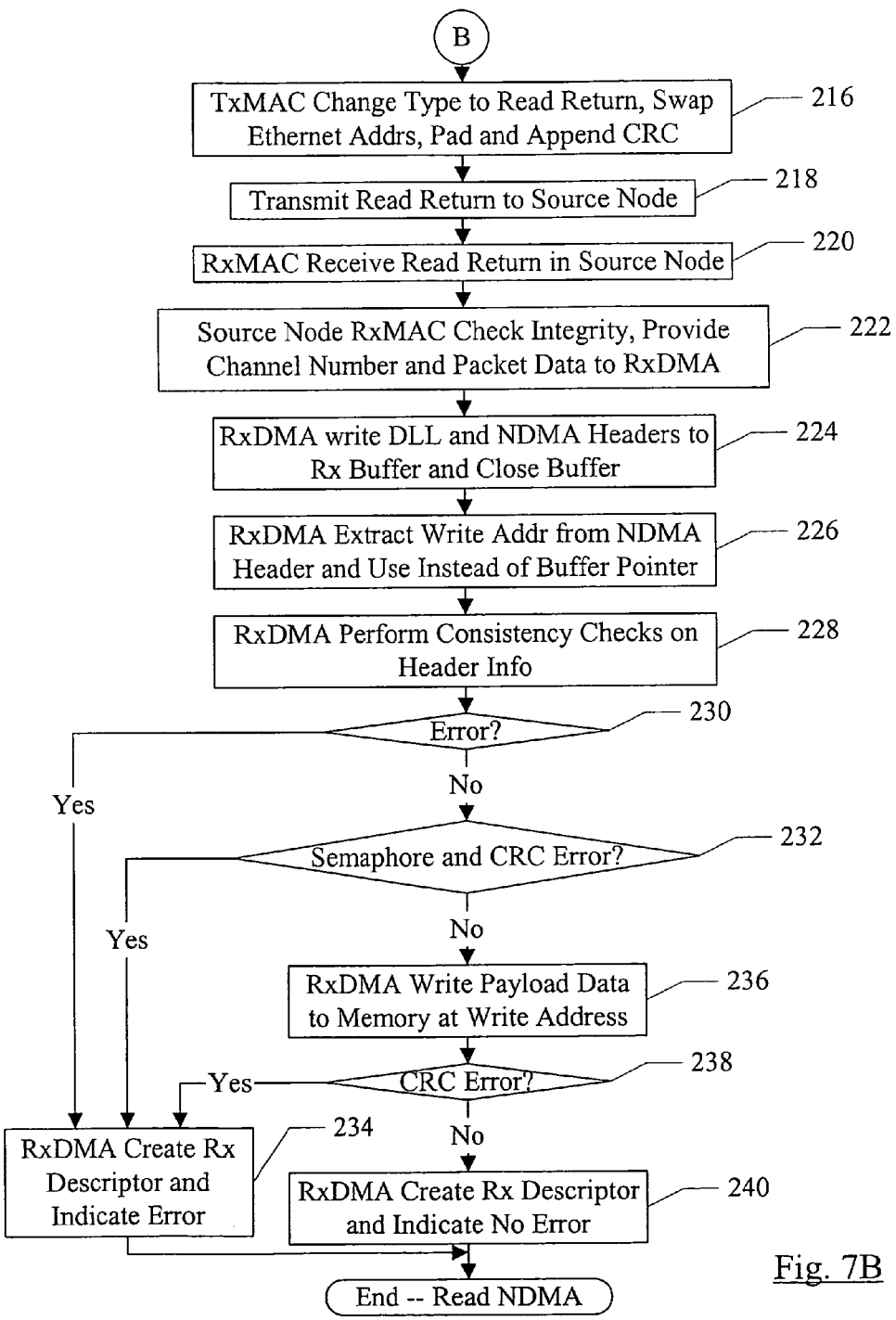

Turning next to FIGS. 7A-7B, a flowchart is shown illustrating operation of one embodiment of nodes hardware in performing an NDMA read operation, for one embodiment. Some portions of the operation may be performed in software, in other embodiments. While the blocks are shown in a particular order in FIGS. 7A-7B for ease of understanding, other orders may be used and/or blocks may be performed in parallel by combinatorial logic circuitry in the nodes. Blocks, combinations of blocks, and/or the flowchart as a whole may be pipelined over multiple clock cycles.

The source node transmits the NDMA read packet to the destination node (block 190). In this embodiment, one NDMA read packet may be transmitted at a time, with a corresponding read return packet being returned by the destination node before the source node initiates another read. Up to 16 kilobytes of data may transferred in the NDMA read return packet, for example. Other embodiments may permit a single NDMA operation to be multiple read packets, and more than one read operation may be outstanding at a time. In one embodiment, the DMA controller 24 (or more particularly, the Tx DMA controller 96) may read the NDMA read packet from one or more Tx descriptors and buffers, and may transmit the packet to the NIC 18 (and more particularly the Tx MAC 92) for transmission on the network.

The destination node receives the NDMA read packet. The Rx MAC 90 in the destination node may check the integrity of the NDMA read packet (e.g. to detect line induced errors) and may provide a channel number and the packet data to the Rx DMA controller 94. The Rx MAC 90 may also signal the Rx DMA controller 94 that the packet is an NDMA packet (block 192). In one embodiment, the nodes may dedicate one or more channels for NDMA packets, and the mapping of the packet to the channel may be determined accordingly. The Rx MAC 90 may detect the NDMA packet via the encoding in the Type field 138. The integrity checks may include checking the header checksum to detect an error in the network header 124, and checking the CRC from the field 128 at the end of the packet. Forwarding of the packet to the Rx DMA controller 94 may occur while the Rx MAC awaits the end of the packet to check the CRC.

The Rx DMA controller 94 in the destination node may consume an Rx Buffer pointer and may write the DLL header 122 and the NDMA header 144 to the buffer. The Rx DMA controller 94 may then close the buffer, storing no additional data to the buffer (block 194). The Rx DMA controller 94 may also extract the read address from the NDMA header 144 (block 196). Still further, the Rx DMA controller 94 may perform various consistency checks on the header information from the NDMA read packet (block 198), similar to the consistency checks described above for an NDMA write packet.

If an error is detected in the consistency checks (decision block 200, "yes" leg), the Rx DMA controller 94 may create an Rx descriptor for the NDMA packet, indicating an error status (block 202). The Rx descriptor may also include a pointer to the buffer storing the DLL and NDMA headers for the packet. Otherwise (decision block 200, "no" leg), the Rx DMA controller 94 may create the Rx descriptor and indicate no error status, and may also include a pointer to the buffer storing the DLL and NDMA headers (block 204). The Rx DMA controller 94 may also write the descriptor (with or without error status, as appropriate) to the Tx descriptor ring corresponding to the Tx channel dedicated for responses (block 206). This descriptor may also include the read address extracted from the NDMA header, the length of the read transfer (e.g. the size of the DLL and NDMA headers plus the payload length from the NDMA header). The Rx DMA controller 94 may also update the descriptor count in the Tx DMA controller 96 so that the Tx DMA controller 96 becomes aware of the descriptor.

The Tx DMA controller 96 may read the descriptor (block 208) and may use the pointer therein to read the DLL and RDMA headers from memory (block 210). Additionally, the Tx DMA controller 96 may use the read address to read the payload data for the packet from memory (block 212). The Tx DMA controller 96 may transmit the packet to the Tx MAC 92 (block 214). It is noted that blocks 212 and 214 may be performed in parallel. For example, the Tx DMA controller 96 may transmit the headers to the Tx MAC 92 (and the Tx MAC 92 may transmit the headers on the network) while the packet payload is read from memory, and/or the Tx DMA controller 96 may transmit earlier packet payload data while later packet payload data is read from memory.

The DLL and RDMA headers and the read data from memory comprise a read return packet, except that the Type field needs to be changed to the Read Return type, the source and destination address fields 132 and 134 need to be swapped, the packet may optionally need to be padded, and the CRC may need to be appended. In this embodiment, the Tx MAC 92 is designed to perform those operations (block 216). In other embodiments, the DMA controller 24 may create a new read return packet. The destination node transmits the read return packet to the source node (block 218) and the Rx MAC 90 in the source node receives the read return packet (block 220).

Similar to the receipt of a NDMA write packet in the destination node, the Rx MAC 90 in the source node may verify the integrity of the packet and provide the packet and corresponding channel number and NDMA indication to the Rx DMA controller 94 (block 222); the Rx DMA controller 94 may write the DLL and NDMA headers to a buffer indicated by an Rx buffer pointer (block 224); the Rx DMA controller 94 may extract the write address from the NDMA header and use it instead of a buffer pointer to write the payload data (block 226); and the Rx DMA controller 94 may perform consistency checks on the header information (block 228). If the Rx DMA controller 94 detects an error in the consistency checks (decision block 230, "yes" leg) or the read return is for a semaphore read and a CRC error is detected (decision block 232, "yes" leg), the Rx DMA controller 94 may create the Rx descriptor and indicate error status (block 234). Otherwise (decision blocks 230 and 232, "no" legs), the Rx DMA controller 94 may write the payload data to memory at the write address extracted from the read return packet (block 236). If a CRC error is detected at the end of the packet (decision block 238, "yes" leg), the Rx DMA controller 94 may create the Rx descriptor with error status (block 234). Otherwise (decision block 238, "no" leg), the Rx DMA controller 94 may create the Rx descriptor and indicate no error (block 240).

Turning now to FIG. 8, a block diagram of one embodiment of an Rx descriptor 250 for a NDMA write packet is shown. As mentioned previously, a descriptor may generally have status/control information describing the type of data stored in the descriptor, error conditions, etc. and may also include one or more pointers to buffers in memory storing the data. Thus, the Rx descriptor 250 includes a header that indicates that the packet length is the length of the DLL and NDMA headers, and the error status determined by the Rx MAC 90 and Rx DMA controller 94. Additionally, the descriptor 250 includes a buffer pointer pointing to the buffer that stores the DLL and NDMA header, and the write address. The Rx descriptor 250 may also be used as the Tx descriptor for the WriteAck packet, since the packet length in the descriptor header is the length of the DLL and NDMA headers, so the write address would not be used for the outgoing packet.

FIG. 9 is a block diagram of one embodiment of an Rx descriptor 252 for a NDMA read packet. The descriptor 252 includes a header indicating that the packet length is the length of the DLL and NDMA headers plus the length of the payload (as indicated in the NDMA header), as well as the status generated by the Rx Mac 90 and the Rx DMA 94. The descriptor 252 also includes the buffer pointer to the DLL and NDMA headers, and the read address (with a size field indicating the size of the payload). As with the descriptor 250, the descriptor 252 may also be used as the Tx descriptor for the read return packet.

Turning next to FIG. 10, an example is shown of the memory contents in the source node and the destination node after an NDMA write has occurred. The source node memory 254 is shown, including a Tx descriptor (created by the source application) stored at local address 100 with a pointer to address 200, at which the NDMA write packet (also created by the source application) is stored. The packet type is a write, the read address is a don't care, and the write address is 300 in this example. The Tx descriptor also includes a pointer to local address 700, at which the data is stored (forming the payload of the packet). The local address 700 may be the address at which the data was stored prior to the application determining that the data was to be DMA transferred to the destination node. Thus, the data need not be copied prior to transmitting the data in the packet.

The destination node memory 256 is also shown. At the local memory address 400, an Rx descriptor is stored that includes a pointer to the address 500 (at which the DLL and NDMA headers are stored). Additionally, the Rx descriptor includes the write address from the packet (300), which points to the data stored in the destination node memory 256. A Tx descriptor is stored at address 600, pointing to the DLL/NDMA header data at address 500 for the WriteAck packet. Both the Tx descriptor and the Rx descriptor may be created by the Rx DMA controller 94 in response to receiving the NDMA write packet, and the data may be written to the address 300 by the Rx DMA controller 94 responsive to the write address field in the NDMA packet.

Figure 11:
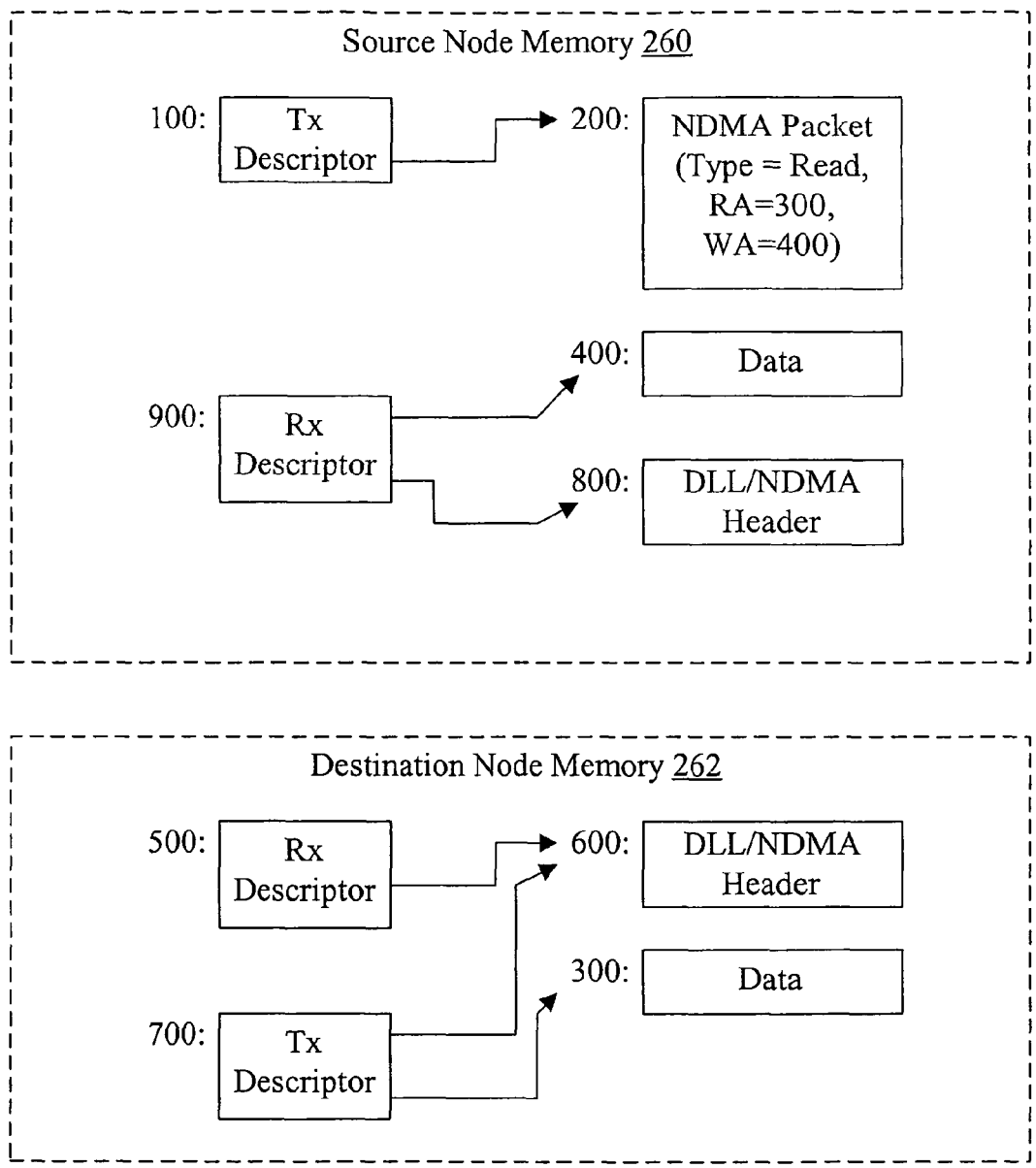
FIG. 11 is a block diagram illustrating memory contents after one embodiment of a DMA read operation.

Turning now to FIG. 11, an example is shown of the memory contents in the source node and the destination node after an NDMA read has occurred. The source node memory 260 is shown, including a Tx descriptor (created by the source application) stored at local address 100 with a pointer to address 200, at which the NDMA read packet (also created by the source application) is stored. The packet type is a read, the read address is 300, and the write address is 400 in this example. The Tx DMA controller 96 in the source node may read the Tx descriptor at the address 100 and may transmit the packet from address 200.

The destination node memory 262 is also shown. At the local memory address 500, an Rx descriptor is stored that includes a pointer to the address 600 (at which the DLL and NDMA headers are stored). A Tx descriptor is stored at address 700, pointing to the DLL/NDMA header data at address 600 for the read return packet. Additionally, the Tx descriptor includes the read address (300) at which the desired data is stored. Both the Tx descriptor and the Rx descriptor may be created by the Rx DMA controller 94 in response to receiving the NDMA read packet.

The Tx DMA controller 96 in the destination node may read the Tx descriptor, and may transmit the read return packet formed from the DLL and NDMA headers and the read data from the address 300. The Rx DMA controller 92 in the source node receives the read return packet and writes the data to the source node memory 260, at address 400 according to the write address in the read return packet (copied by the destination node from the read packet). The Rx DMA controller 92 also generates a Tx descriptor at address 900 that includes pointers to the DLL and NDMA header at address 800 and the data at address 400.

It is noted that, while different numerical addresses were used in the source node memory 254 and the destination node memory 256 in the example of FIG. 10, and different numerical addresses were used in the source node memory 260 and the destination node memory 262 in the example of FIG. 11, the addresses used in the destination and source memories can be numerically the same, since they are local memory addresses that are mapped to different memory locations in each node.

It is noted that, while specific operations in the performance of NDMA were described as being implemented in the NIC 18 and/or DMA controller 24 in the above description (and in the Tx or Rx portions thereof, in some cases), such operations may be implemented in any desired circuitry within a node, in other embodiments.

Numerous variations and modifications will become apparent to those skilled in the art once the above disclosure is fully appreciated. It is intended that the following claims be interpreted to embrace all such variations and modifications.

What is claimed is:

1. A system comprising:
at least a first node and a second node coupled to a network, wherein the second node comprises a local memory and a direct memory access (DMA) controller coupled to the local memory;
wherein the first node is configured to transmit at least a first packet to the second node to access data in the local memory, and wherein a first local memory address identifying a location in the local memory to be accessed in response to the first packet is included in a network header of the first packet, and wherein the network header corresponds to a network layer of packet processing, and wherein the first packet further includes a data link layer header corresponding to a data link layer of packet processing, and wherein the data link layer header abuts the network header in the first packet; and responsive to the first packet, the second node is configured to extract the first local memory address directly from a field in the network header of the first packet and the DMA controller is configured to perform one more transfers with the local memory using the first local memory address to access the data at the first local memory address in the local memory.

2. The system as recited in claim 1 wherein the first packet is captured from the data link layer in a protocol stack that implements the packet processing.

3. The system as recited in claim 2 wherein the first packet is removed from the protocol stack at the data link layer and the first packet is not processed at the network layer.

4. The system as recited in claim 3 wherein the first packet excludes a transport header corresponding to a transport layer of packet processing.

5. The system as recited in claim 4 wherein the first packet further excludes an application header corresponding to an application layer of packet processing.

6. The system as recited in claim 1 wherein the network header abuts a payload of the first packet.

7. The system as recited in claim 1 wherein the data link layer header specifies that the first packet is coded to access memory.

8. The system as recited in claim 1 wherein the field containing the first local memory address in the network header is the same field that one of the Internet protocol (IP) addresses would be located in another packet that is not coded to access memory.

9. The system as recited in claim 8 wherein, if the first packet is a read, the network header further includes a second local memory address to which the data is to be written in a second local memory in a receiving node, and wherein the second local memory address is included in the network header in the same position that the other one of the Internet protocol (IP) addresses would be located.

10. The system recited in claim 8 wherein the first local memory address is protected by a header checksum included in the network header.

11. A node comprising:
a network interface controller (NIC) configured to couple the node to a network, wherein the NIC is configured to receive a first packet from the network, and wherein the first packet comprises a network header corresponding to a network layer of packet processing and a data link layer header corresponding to a data link layer of packet processing, and wherein the data link layer header abuts the network header in the first packet;
a local memory; and
a direct memory access (DMA) controller coupled to the local memory and the NIC, and wherein the DMA controller is configured to perform one or more transfers with the local memory to access the data specified by the first packet, wherein a first local memory address identifying a location in the local memory to be accessed in response to the first packet is included in the network header of the first packet, and wherein the the first local memory address is extracted directly from a field in the network header of the first packet, and wherein the DMA controller is configured to use the first local memory address to address the local memory.

12. The node as recited in claim 11 wherein the NIC is configured to capture the first packet from a data link layer of processing, and wherein the DMA controller is configured to perform the one or more transfers with the local memory to access the data specified by the first packet responsive to the first packet captured from the data link layer of processing.

13. The node as recited in claim 12 wherein the NIC is configured to remove the first packet from a protocol stack at the data link layer and the first packet is not processed at the network layer, wherein the protocol stack implements the packet processing.

14. The node as recited in claim 13 wherein the first packet excludes a transport header corresponding to a transport layer of packet processing and further excludes an application header corresponding to an application layer of packet processing.

15. The node as recited in claim 14 wherein the NIC is further configured to receive another packet not coded as a DMA access to the local memory, and wherein the node is configured to process the other packet to the application layer of packet processing.

16. The node as recited in claim 11 wherein the data link layer header specifies that the first packet is coded to access memory.

17. A method comprising:
a network interface controller (NIC) receiving a first packet from a network, wherein the first packet specifies an access to local memory in a node that includes the NIC, and wherein a first local memory address identifying a location in the local memory to be accessed in response to the first packet is included in a network header of the first packet, and wherein the network header corresponds to a network layer of packet processing, and wherein the first packet further includes a data link layer header corresponding to a data link layer of packet processing, and wherein the data link layer header abuts the network header in the first packet;
extracting the first local memory address directly from a field in the network header of the first packet; and
a DMA controller performing one or more transfers with the local memory using the local memory address to access the data.

18. The method as recited in claim 17 further comprising extracting the first packet from the data link layer of packet processing, whereby the first packet is not processed above the data link layer of packet processing in a protocol stack that implements the packet processing.

19. The method as recited in claim 18 further comprising:
receiving a second packet that is not coded to access the local memory; and
processing the second packet to an application layer of packet processing in the protocol stack.

20. The method as recited in claim 17 wherein the data link layer header specifies that the first packet is coded to access memory, and wherein the field in the network header that includes the first local memory address is the same field that one of the Internet protocol (IP) addresses would be located in another packet that is not coded to access memory.

* * * * *